Patented Nov. 29, 1932

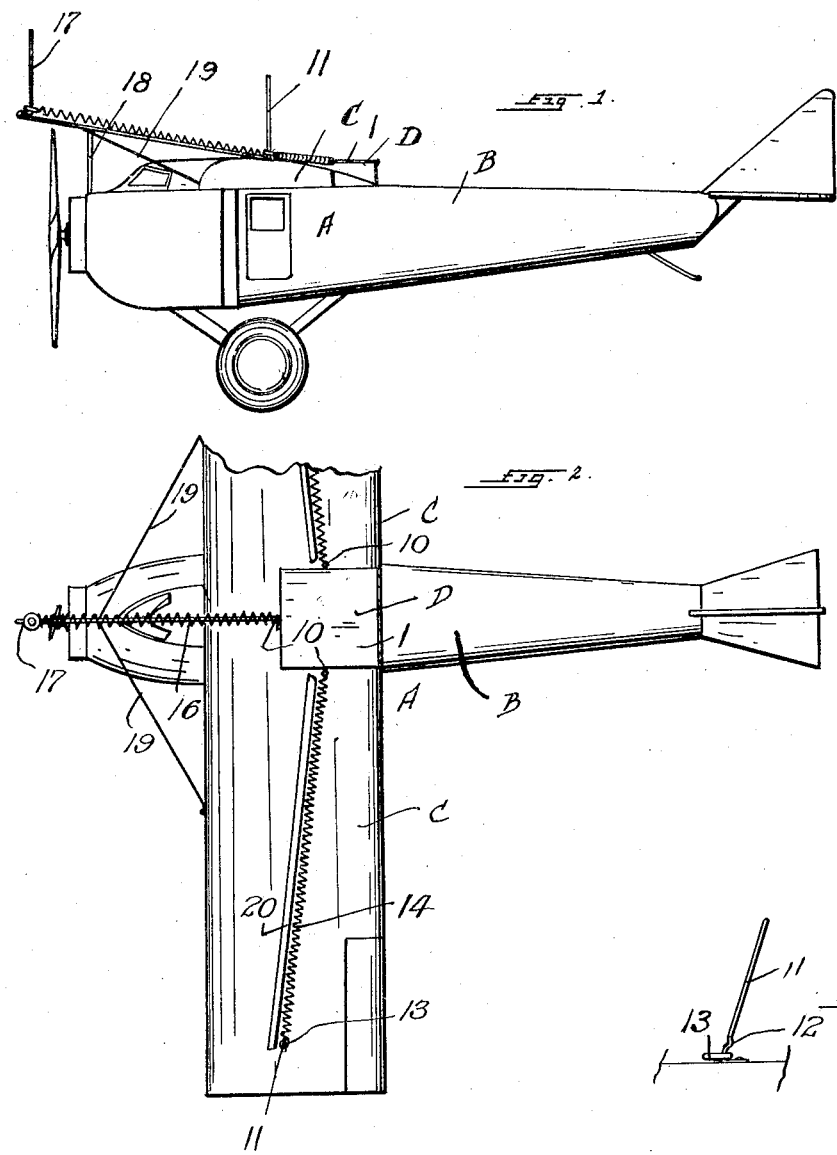

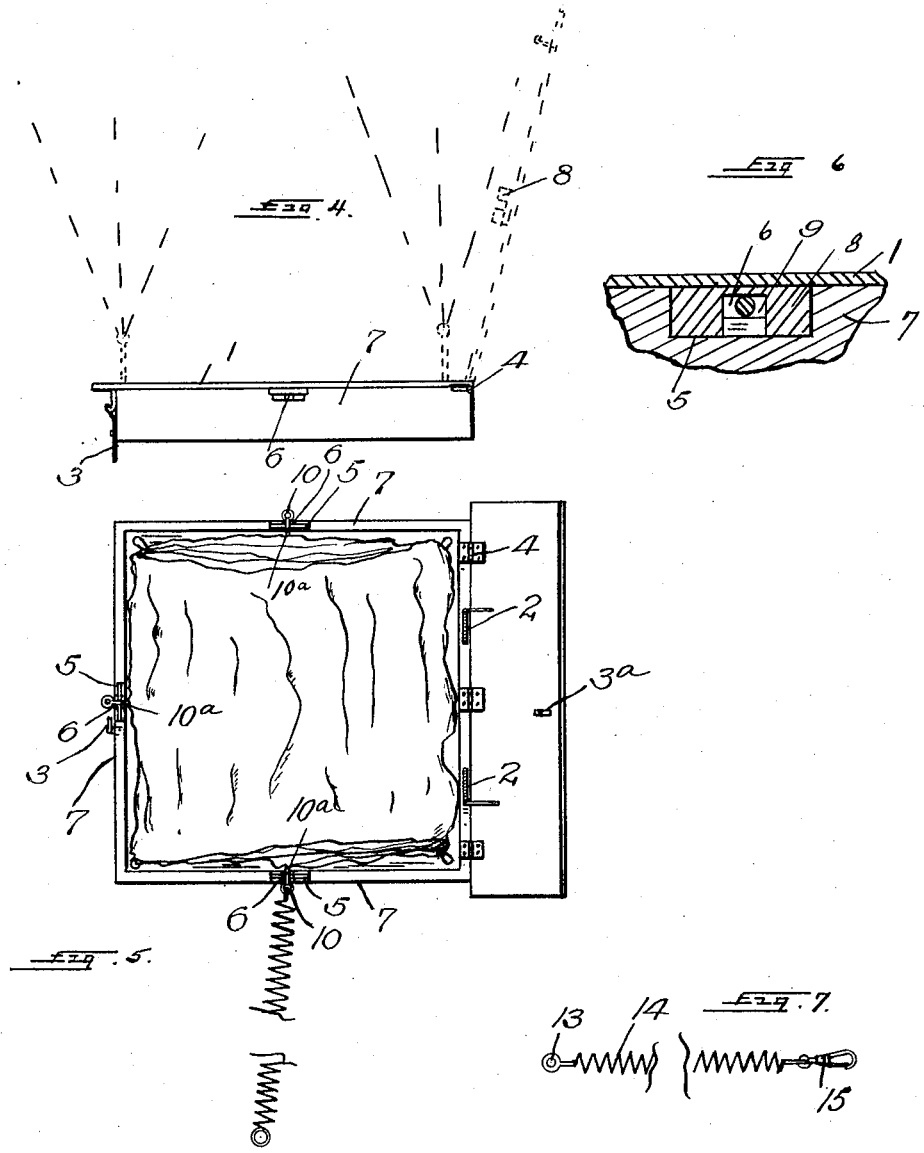

1,889,038

UNITED STATES PATENT OFFICE

MILTON J. NOUSLAKIS, OF BINGHAM CANYON, UTAH

SAFETY PARACHUTE FOR AEROPLANES

Application filed March 26, 1931. Serial No. 525,399.

My invention relates to aeroplanes and more particularly to safety parachutes for landing planes and has for its object to provide a positive opening parachute for landing the plane when anything occurs to stop the engine or cause a forced landing.

A further object is to provide a positive opening parachute which will be opened by the use of springs and the currents of air will catch in the opened portion of the chute and complete the opening thereof.

A still further object is to provide a parachute which can be instantaneously released to right the plane and bring it safely to the ground should anything happen to the pilot or should the plane go into a tail spin.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a side elevation of a plane with my device made therein.

Figure 2 is a plan view of Figure 1.

Figure 3 is a side view of one of the ring engaging struts used in stretching the envelope opening springs.

Figure 4 is a side elevation of the container in which the chute is placed, with dotted lines to indicate the box open and the parachute cords extending upward therefrom.

Figure 5 is a plan view of the container for the parachute with the top open and the parachute shown folded therein, one spring shown secured thereto.

Figure 6 is a section of one of the spring engaging eye bolts secured to one side of the parachute and a section of the portion of the container through which the stem of the eye bolt is passed, with the bracket of the lid of the box shown holding the stem in place in the container.

Figure 7 is a side elevation of one of the springs, parts cut out.

In the drawings I have shown the plane as A, the fuselage as B, and the wings as C. Medially of the wings C over the fuselage or on the top of the fuselage when the wings are separated thereby, I secure my container box D, at the center of gravity of the plane. The container is provided with a spring opened lid 1, having springs 2 to open the lid when the catch 3 is released by the operator. The springs may be in the hinges 4 if desired. The hinges 4 secure the lid to the box and provide the means of holding the back side of the device solid. On two sides and the front of the box I cut slots 5, having grooves 6 running therethrough, at right angles thereto and completely through the side wall 7 of the container. On the bottom side of the lid I then secure spacer and retainer lugs 8, adapted to fit into the slots 5 with the opening 9 therein to encompass the stem of the eye bolts, when they are passed through the grooves 6. Each parachute is provided with three spaced apart eye bolts 10, secured to the rim of the envelope with the legs 10a of the eye bolts long enough to pass out of the grooves 6 of the container.

Onto the top side of each wing C, I then secure ring holding struts 11, said struts having angles 12 bent therein near the bottom end thereof where they are secured to the wing, said angles to hold the rings 13 of the springs 14 in place on the strut until the parachute has been opened by the air currents and the raising of the chute will then raise the rings from the struts. The springs 14 are provided with rings 13 in one end thereof and spring held catches 15 in the other end thereof with the rings to be carried on the struts and the catches 15 to be engaged with the eye bolts 10 of the parachute.

There are three springs used, one to engage each eye bolt and the spring 16, which extends forward from the container is engaged over a forwardly extended steel strut 17 which extends forward above the propeller and supported by a brace 18 down the fuselage, and by guy wires 19 running back from the strut to the wings of the plane. The strut 17 is formed of a rod of metal extended forward with the end bent upward to form the ring engaging strut similar to the struts 11.

The spring 14 extending over the wings are provided with wind shields 20 secured to the top of the wings to break the force of the wind against the springs and to direct the air currents over the springs.

The operation of my invention is as follows:

The operator when needing the parachute releases the lid 1, by disengaging the catch 3 from the dog 3a and the springs 2 instantly raised the lid allowing the springs 14 to draw the eye bolts 10 from the grooves 6 and the contracting tension of the springs will draw the envelope of the parachute out of the container and the air currents will then complete the opening of the parachute, supporting the plane thereunder, thereby providing a safe landing.

Having thus described my invention I desire to secure by Letters Patent and claim:

1. In a parachute the combination of a container carried in the top of the wings of a plane; eye bolts secured to three sides of the envelope of the parachute; means to secure the envelope to the container by the usual ropes; grooves through the top of three sides of the container through which the eye bolts are passed; struts mounted one on each end of the wings and one out in front of the plane; and springs adapted to have one end engaged slidably over said struts and the other end secured by a catch to said eye bolts, said springs to contact when the container is opened, drawing the envelope from the container instantly.

2. In a device of the class described the combination of a parachute, means to secure the parachute to the plane by the usual ropes; a parachute envelope container mounted above the center of gravity of a plane; springs secured to the edges of said parachute; means to secure the ends of the springs to the ends of the wings and in front of the plane, means to release springs from the ends of the wings and from in front of the plane when the parachute has partially opened; and means to release the parachute and springs from said container.

In testimony whereof I have affixed my signature.

MILTON J. NOUSLAKIS.